(12) United States Patent
Ida et al.

(10) Patent No.: US 9,188,894 B2
(45) Date of Patent: Nov. 17, 2015

(54) METHOD FOR MANUFACTURING CORE-SHELL STRUCTURE FINE PARTICLES AND TONER

(71) Applicant: CANON KABUSHIKI KAISHA, Tokyo (JP)

(72) Inventors: Hayato Ida, Yokohama (JP); Takaho Shibata, Tokyo (JP); Yuya Chimoto, Kawasaki (JP); Takashi Hirasa, Yokohama (JP); Masayoshi Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 14/349,296

(22) PCT Filed: Oct. 2, 2012

(86) PCT No.: PCT/JP2012/076061
§ 371 (c)(1),
(2) Date: Apr. 2, 2014

(87) PCT Pub. No.: WO2013/051726
PCT Pub. Date: Apr. 11, 2013

(65) Prior Publication Data
US 2015/0037717 A1    Feb. 5, 2015

(30) Foreign Application Priority Data

Oct. 4, 2011 (JP) ................. 2011-219911

(51) Int. Cl.
| | | |
|---|---|---|
| *G03G 9/08* | (2006.01) | |
| *G03G 9/093* | (2006.01) | |
| *B01J 13/02* | (2006.01) | |
| *C08J 3/12* | (2006.01) | |
| *C09B 67/08* | (2006.01) | |

(52) U.S. Cl.
CPC ............ *G03G 9/09392* (2013.01); *B01J 13/02* (2013.01); *C08J 3/126* (2013.01); *C09B 67/0004* (2013.01); *G03G 9/093* (2013.01); *G03G 9/09328* (2013.01); *G03G 9/09371* (2013.01); *C08J 2367/00* (2013.01); *C08J 2467/00* (2013.01)

(58) Field of Classification Search
CPC .................................................. G03G 9/09392
USPC ....................................... 430/137.11, 137.12
See application file for complete search history.

(56) References Cited

U.S. PATENT DOCUMENTS

2010/0209840 A1    8/2010    Ikuta et al.

FOREIGN PATENT DOCUMENTS

| EP | 2249207 A1 | 11/2010 |
|---|---|---|
| JP | 2000-191892 A | 7/2000 |
| JP | 2004-189765 A | 7/2004 |
| JP | 2006-133470 A | 5/2006 |
| JP | 2006-276073 A | 10/2006 |
| JP | 2007-003840 A | 1/2007 |
| JP | 4135654 B2 | 8/2008 |
| JP | 2008-201865 A | 9/2008 |
| JP | 2008-209455 A | 9/2008 |
| JP | 2009-057487 A | 3/2009 |
| JP | 2010-020147 A | 1/2010 |
| JP | 2011-008244 A | 1/2011 |
| JP | 2011-100104 A | 5/2011 |
| JP | 2011-128575 A | 6/2011 |

OTHER PUBLICATIONS

"Surface Chemistry", GU Tiren, pp. 51-52, Science Press, Jun. 1994.

*Primary Examiner* — Mark A Chapman
(74) *Attorney, Agent, or Firm* — Canon U.S.A. Inc., IP Division

(57) ABSTRACT

The method for manufacturing core-shell structure fine particles, includes adding metal salt into an aqueous medium containing shell particles A and core particles B to thereby attach the shell particles A to the surface of each of the core particles B and the toner contains the core-shell structure fine particles.

(1) The zeta potential of the core particles B and the zeta potential of the shell particles A are the same polarity.
(2) |Zeta potential of the core particles B when adding metal salt|<|Zeta potential of the shell particles A when adding metal salt|
(3) (Median diameter based on the volume of the core particles B)>(Median diameter based on the volume of the shell particles A).

7 Claims, No Drawings

METHOD FOR MANUFACTURING CORE-SHELL STRUCTURE FINE PARTICLES AND TONER

TECHNICAL FIELD

The present invention relates to a method for manufacturing core-shell structure fine particles. The present invention also relates to toner containing core-shell structure fine particles obtained by the manufacturing method and used for developing an electrostatic charge image for use in an electrophotographic method.

BACKGROUND ART

In image formation, measures for further lowering a toner fixing temperature have been increasingly taken with an increase in a demand for energy saving. As one of the measures, it has been proposed to further lower the fixing temperature by the use of resin with a low softening temperature as a constituent material of toner. However, when using the resin with a low softening temperature, blocking in which toner particles adhere to each other sometimes occur when allowed to stand still during storage or transportation. Then, a core-shell structure has been proposed in which the resin with a low softening point is covered with resin with a high softening point (PTLs 1 to 3). It is considered that the use of toner particle having the core-shell structure (hereinafter also referred to as core-shell structure toner particles) allows manufacturing of toner in which the resin with a low softening point is not exposed to the toner surface and heat-resistant storageability and low-temperature fixability have been achieved. Moreover, in order to manufacture the toner particle having the core-shell structure, a method has been reported which includes controlling a change in the zeta potential of the core and the shell during manufacturing (PTL 4).

In recent years, there is a tendency such that the use of organic solvents is restricted from the position of environmental protection, saving resources, regulation of dangerous substances by the Fire Services Act, and workplace environment improvement. Thus, a development of manufacturing a fine particle water dispersion under the conditions of substantially not using a solvent has been actively performed (PTLs 5 to 7).

As a result of our examination, it was confirmed that when it was attempted to form a core-shell structure by using fine particles manufactured under the conditions of substantially not using a solvent as shell particles, and then attaching the shell particles to core particles in an aqueous medium, the shell particles are aggregated to each other. Therefore, in such a state, the core-shell structure is not formed or an aggregate of the shell particles adhere to the core particles, resulting in the formation of a nonuniform core-shell structure.

Even when a manufacturing method described in PTL 4 is used and even when a fine particle dispersion manufactured under the conditions of substantially not using a solvent is used as the shell particles, the aggregation of the shell particles occurs, so that the core-shell structure cannot be formed.

Thus, it has been difficult to form the core-shell structure using the fine particles manufactured under the conditions of substantially not using a solvent as the shell particles.

CITATION LIST

Patent Literature

PTL 1 Japanese Patent Laid-Open No. 2006-276073
PTL 2 Japanese Patent Laid-Open No. 2007-3840
PTL 3 Japanese Patent No. 4135654
PTL 4 Japanese Patent Laid-Open No. 2008-209455
PTL 5 Japanese Patent Laid-Open No. 2000-191892
PTL 6 Japanese Patent Laid-Open No. 2004-189765
PTL 7 Japanese Patent Laid-Open No. 2008-201865

SUMMARY OF INVENTION

The present invention relates to a method for manufacturing core-shell structure fine particles, including adding metal salt into an aqueous medium in which at least shell particles A and core particles B are dispersed to thereby attach the shell particles A to the surface of each of the core particles B, in which the shell particles A and the core particles B satisfy the following relationships (1) to (3);

(1) The zeta potential of the core particles B and the zeta potential of the shell particles A are the same polarity.
(2) |Zeta potential of the core particles B when adding metal salt|<|Zeta potential of the shell particles A when adding metal salt|
(3) (Median diameter based on the volume of the core particles B)>(Median diameter based on the volume of the shell particles A).

The invention also relates to toner containing toner particles and an external additive, in which the toner particles are the core-shell structure fine particles manufactured by the method for manufacturing core-shell structure fine particles described above.

According to the invention, even when fine particles manufactured under the conditions of substantially not using a solvent are used as shell particles, the core-shell structure fine particles can be manufactured. Moreover, even when fine particles manufactured under the conditions of substantially not using a solvent are used as shell particles, toner excellent in both blocking resistance and fixability can be obtained.

DESCRIPTION OF EMBODIMENTS

First, the core particles B and the shell particles A forming the core-shell structure fine particles are described.

As the core particles B for use in the invention, arbitrary particles obtained by known manufacturing methods can be used. Specifically, mentioned are core particles manufactured by a grinding method, a melt suspension method, a suspension polymerization method, and an emulsification polymerization method.

As a specific example, a method for manufacturing the core particles by an emulsification aggregation method is described below.

The emulsification aggregation method is a manufacturing method which includes preparing resin fine particles which are sufficiently small to the particle size of the core particles beforehand, and aggregating the resin fine particles in an aqueous medium to thereby manufacture core particles. In the emulsification aggregation method, the core particles are manufactured through a manufacturing process, an aggregation process, a fusion process, and a cooling process of an aqueous dispersion of resin fine particles in which the resin fine particles are dispersed in an aqueous medium.

Manufacturing Process of Aqueous Dispersion of Resin Fine Particles for Core

The aqueous dispersion of the resin fine particles for core is prepared by a known method. For example, in the case of a resin fine particle dispersion liquid containing resin particles containing a vinyl monomer, particularly, a styrene monomer, as a constituent element, the resin fine particle dispersion liquid can be prepared by carrying out emulsification polymerization of the monomer using a surfactant. Moreover, in the case of resin (e.g., polyester resin) produced by another method, a resin particle dispersion liquid can be produced by melting the resin in a solvent when the resin is an oil-based substance and dissolves in a solvent having relatively low solubility in water, dispersing resin fine particles in an aqueous medium by a dispersing machine, such as a homogenizer, together with a surfactant and a polymer electrolyte, and then heating or decompressing the same to remove the solvent.

It is suitable to add an aqueous medium and a surfactant to resin, and then perform emulsification dispersion in an aqueous medium substantially not containing an organic solvent by a dispersing machine of applying a high-speed shearing force, such as Clearmix, a homomixer, or a homogenizer, while heating the mixture to a temperature equal to or higher than the softening temperature of the resin. In particular, it is suitable that the content of the organic solvent having a boiling point of 100° C. or lower is 100 μg/g or lower. When the content of the organic solvent is within the above-mentioned range, the load of the process for removing and collecting the organic solvent is reduced or the process is not required. The organic solvent content in the aqueous medium can be measured using gas chromatography (GC).

As the resin for core, the following substances can be specifically mentioned.

Mentioned are homopolymers or copolymers (styrene resin) of styrenes, such as styrene, parachloro styrene, and α-methylstyrene; homopolymers or copolymers (vinyl resin) of esters having a vinyl group, such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate; homopolymers or copolymers (vinyl resin) of vinyl nitrils, such as acrylonitrile and metacrylonitrile; homopolymers or copolymers (vinyl resin) of vinyl ethers, such as vinyl ethyl ether and vinyl isobutyl ether; homopolymers or copolymers (vinyl resin) of vinyl ketones, such as vinyl methyl ketone, vinyl ethyl ketone, and vinyl isopropenyl ketone; homopolymers or copolymers (olefin resin) of olefins, such as ethylene, propylene, butadiene, and isoprene; non-vinyl condensed resin, such as epoxy resin, polyester resin, polyurethane resin, polyamide resin, cellulosic resin, and polyether resin; and graft polymers of the non-vinyl condensed resins and vinyl monomers.

These resins may be used singly or in combination of two or more kinds thereof. Among the above, the polyester resin is suitable which has sharp melt properties and excellent intensity even when the resin has a low molecular weight.

It is suitable for the resin for core to have an ionic group, such as a carboxylic acid group, a sulfonic acid group, and an amino group in the resin skeleton, and it is more suitable for the resin for core to have a carboxylic acid group. The acid value of the resin for core is suitably 3 to 35 mgKOH/g and more suitably 8 to 25 mgKOH/g. Due to the fact that the acid value of the resin for core is within the above-mentioned range, the chargeability of the core-shell structure fine particles can be further stabilized. The acid value refers to the mg number of potassium hydrate required for neutralizing acid components, such as unesterified fatty acid and resin acid, contained in per gram of a sample. The measurement method is performed as follows according to JIS-K0070.

1. Reagent

Solvent: A tetrahydrofuran-ethyl alcohol mixed liquid (2:1) is neutralized with a 0.1 Normal potassium hydrate ethyl alcohol solution using phenolphthalein as an indicator immediately before use.

Phenolphthalein solution: 1 g of phenolphthalein is melt in 100 ml of ethyl alcohol (95% by volume).

0.1 Normal potassium hydrate ethyl alcohol solution: 7.0 g of potassium hydrate is melt in as small amount of water as possible, ethyl alcohol (95% by volume) is added to give t liter, the mixture is left standing for two to three days, and then the mixture is filtered. The standardization is performed according to JIS K 8006 (Basic point relating to titration in a reagent content test).

2. Operation 1 to 20 g of a resin for core is accurately weighed out as a sample, 100 ml of the solvent and several drops of the phenolphthalein solution are added as an indicator to the resin, and then the mixture is sufficiently shook until the sample completely melts. In the case of a solid sample, the sample is warmed in water bath for melting. After cooling, the resultant substance is titrated with the 0.1 Normal potassium hydrate ethyl alcohol solution. Then, the time when slight red color of the indicator continues for 30 seconds is defined as the terminal point of neutralization.

3. Equation

The acid value is calculated by the following equation.

$$A = B \times f \times 5.611/S$$

A: Acid value

B: Used amount of 0.1 Normal potassium hydrate ethyl alcohol solution (ml)

f: Factor of 0.1 Normal potassium hydrate ethyl alcohol solution

S: Sample (g)

The glass transition temperature (Tg1) of the resin for core is suitably 30° C. or higher and 60° C. or lower and more suitably 40° C. or higher and 60° C. or lower. Due to the fact that the glass transition temperature (Tg1) of the resin for core is within the above-mentioned range, the transfer properties and a reduction in the toner transfer unevenness during printing of a large number of sheets and image glossiness can be further improved. The glass transition temperature (Tg1) of the resin for core is a physical property value measured based on JIS K7121 and refers to the middle point glass transition temperature described in the standard.

The softening temperature (Tm) of the resin for core is suitably 70° C. or higher and 110° C. or lower, more suitably 70° C. or higher and 100° C. or lower, and most suitably 80° C. or higher and 100° C. or lower. Due to the fact that the softening temperature (Tm) of the resin for core is within the above-mentioned range, the blocking resistance, the offset resistance, and the surface smoothness and the fixability of the image after fixing can be further improved. The softening temperature (Tm) of the resin for core is measured using a flow tester (CFT-500D: manufactured by Shimadzu Corp.). Specifically, 1.2 g of a sample to be measured is weighed, and is measured using a die having a height of 1.0 mm and a hole diameter of 1.0 mm under the conditions of a temperature elevation rate of 4.0° C./min, a preheating time of 300 seconds, a load of 5 kg, and a measurement temperature range of 60 to 200° C. The temperature when ½ of the sample flows out is defined as the softening temperature.

The surfactant is not particularly limited and the following substances are specifically mentioned.

Mentioned are anionic surfactants, such as a sulfate type, a sulfonate type, a carboxylate type, a phosphate type, and a soap; cationic surfactants, such as an amine salt type and a quaternary ammonium salt type; and non-ionic surfactants, such as a polyethylene glycol type, an alkylphenol ethylene oxide adduct type, and a polyvalent alcohol type.

The surfactants may be used singly or in combination of two or more thereof. In the invention, it is suitable to use a sulfonate surfactant due to the reasons described below.

The median diameter based on the volume of the resin fine particles for core is suitably 0.05 to 1.0 µm and more suitably 0.05 to 0.4 µm. When the median diameter based on the volume of the resin fine particles forming the core particles B is within the above-mentioned range, toner particles can be obtained which have an appropriate particle size such that the median diameter based on the volume is 4.0 to 7.0 µm. The median diameter based on the volume can be measured by the use of a dynamic light scattering particle size distribution meter (Nanotrack UPA-EX150: manufactured by Nikkiso).

Aggregation Process

The aggregation process refers to a process which includes mixing the above-described aqueous dispersion of the resin fine particles for core, an aqueous dispersion of coloring agent fine particles, and, as required, a toner ingredient, such as a mold release agent, to prepare a mixed liquid, and then aggregating particles contained in the prepared mixed solution to form an aggregate. As a method for forming the aggregate, a method is suitably mentioned which includes adding and mixing an aggregation agent in the mixed solution, and then applying, as appropriate, temperature and mechanical power thereto.

The aqueous dispersion of coloring agent fine particles is obtained by dispersing coloring agent particles in an aqueous medium. The coloring agent particles are dispersed by known methods, and media type dispersing machines, such as a rotation shearing type homogenizer, a ball mill, a sand mill, and an attritor, and a high-pressure collision type dispersing machine are suitably used.

Mentioned as the coloring agent are known organic pigments or dyes, carbon black, magnetic powder, and the like.

Mentioned as a cyan coloring agent are a copper phthalocyanine compound and a derivative thereof, an anthraquinone compound, and a basic lake compound. Specifically mentioned are C.I. pigment blue 1, C.I. pigment blue 7, C.I. pigment blue 15, C.I. pigment blue 15:1, C.I. pigment blue 15:2, C.I. pigment blue 15:3, and C.I. pigment blue 15:4, C.I. pigment blue 60, C.I. pigment blue 62, and C.I. pigment blue 66.

Mentioned as a magenta coloring agent are a condensed azo compound, a diketopyrrolopyrrole compound, anthraquinone, a quinacridone compound, a basic dye lake compound, a naphthol compound, a benzimidazolone compound, a thioindigo compound, and a perylene compound. Specifically mentioned are C.I. pigment red 2, C.I. pigment red 3, C.I. pigment red 5, C.I. pigment red 6, C.I. pigment red 7, C.I. pigment violet 19, C.I. pigment red 23, C.I. pigment red 48:2, C.I. pigment red 48:3, C.I. pigment red 48:4, C.I. pigment red 57:1, C.I. pigment red 81:1, C.I. pigment red 122, C.I. pigment red 144, C.I. pigment red 146, C.I. pigment red 166, C.I. pigment red 169, C.I. pigment red 177, C.I. pigment red 184, C.I. pigment red 185, C.I. pigment red 202, C.I. pigment red 206, C.I. pigment red 220, C.I. pigment red 221, and C.I. pigment red 254.

Mentioned as a yellow coloring agent are a condensed azo compound, an isoindolinone compound, an anthraquinone compound, an azo metal complex, a methine compound, and an allyl amide compound. Specifically mentioned are C.I. pigment yellow 12, C.I. pigment yellow 13, C.I. pigment yellow 14, C.I. pigment yellow 15, C.I. pigment yellow 17, C.I. pigment yellow 62, C.I. pigment yellow 74, C.I. pigment yellow 83, C.I. pigment yellow 93, C.I. pigment yellow 94, C.I. pigment yellow 95, C.I. pigment yellow 97, C.I. pigment yellow 109, C.I. pigment yellow 110, C.I. pigment yellow 111, C.I. pigment yellow 120, C.I. pigment yellow 127, C.I. pigment yellow 128, C.I. pigment yellow 129, C.I. pigment yellow 147, C.I. pigment yellow 151, C.I. pigment yellow 154, C.I. pigment yellow 155, C.I. pigment yellow 168, C.I. pigment yellow 174, C.I. pigment yellow 175, C.I. pigment yellow 176, C.I. pigment yellow 180, C.I. pigment yellow 181, C.I. pigment yellow 191, and C.I. pigment yellow 194.

Mentioned as a black coloring agent are carbon black, magnetic powder, or substances obtained by toning the color to black color using the yellow coloring agents, the magenta coloring agents, and the cyan coloring agents mentioned above.

These coloring agents can be used singly or as a mixture or, further, in a solid solution state. The coloring agents for use in the invention are selected from the points of a hue angle, chromaticness, brightness, lightfastness, OHP transparency, and dispersibility in toner.

The content of the cyan coloring agent, the magenta coloring agent, the yellow coloring agent, or the black coloring agent is suitably 1 to 20 parts by mass based on 100 part by mass of the resin forming the core particles B.

Mentioned as the mold release agent are low molecular weight polyolefins, such as polyethylene; silicones having a melting point (softening point) by heating; fatty acid amides, such as oleic acid amide, erucic acid amide, recinoleic acid amide, and stearic acid amide; ester waxes, such as stearyl stearate; plant waxes, such as carnauba wax, rice wax, candelilla wax, japan wax, and jojoba oil; animal wax, such as beeswax; mineral/petroleum wax, such as Montan wax, ozocerite, ceresin, paraffin wax, microcrystalline wax, Fischer-Tropsch Wax, and ester wax; and denatured substances thereof.

Mentioned as the aggregation agent are metal salts of monovalent metals, such as sodium and potassium, metal salts of divalent metals, such as calcium and magnesium; metal salts of trivalent metals, such as iron and aluminum.

The addition and mixing of the aggregation agent is suitably performed at a temperature equal to or lower than the glass transition temperature (Tg) of the resin fine particles contained in the mixed solution. When the mixing is performed under the temperature conditions, the aggregation proceeds in a stable state. The mixing can be performed using known mixing devices, such as a homogenizer and a mixer.

The average particle size of the aggregate formed herein is not particularly limited and is usually almost the same as the average particle size of toner particles to be obtained. Specifically, the average particle size of the aggregate is suitably 3.0 to 10.0 µm, more suitably 4.0 to 7.0 µm, and most suitably 5.0 to 7.0 µm. The particle size of the aggregate can be controlled by determining and changing as appropriate the temperature of adding and mixing the aggregation agent and the stirring and mixing conditions. The average particle size and the particle size distribution of the toner particle can be measured by a particle size distribution analyzer (COULTER MULTISIZER III: manufactured by Coulter) by the Coulter method.

Fusion Process

The fusion process refers to a process for heating the aggregate to a temperature equal to or higher than the glass transition point (Tg) of the resin for fusion to thereby manufacture the core particles B in which the aggregate surface is smoothened. According to this process, the surface area of the aggregate decreases, and the shell particles A efficiently adhere in the adhesion process described below. Before a primary fusion process, in order to prevent the melting and bonding between toner particles, a chelating agent, a pH adjuster, and a surfactant may be put therein as appropriate.

Mentioned as the chelating agent are alkali metal salts, such as ethylene diamine tetra acetic acid (EDTA) and Na salt thereof, sodium gluconate, sodium tartrate, potassium citrate, sodium citrate, nitrotriacetate (NTA) salt, many water-soluble polymers (polymer electrolytes) containing both functionalities of COOH and OH.

The heating temperature in the fusion process may be between the glass transition temperature (Tg) of the resin contained in the aggregate and a temperature at which the resin undergoes thermal cracking. The heating and fusion time may be short when the heating temperature is high and needs to be long when the heating temperature is low. More specifically, since the heating and fusion time is dependent on the heating temperature, the time cannot be generally specified but is generally 10 minutes to 10 hours.

Cooling Process

The cooling process refers to a process for cooling the temperature of the aqueous medium containing the core particles B until the temperature reaches a temperature lower than the glass transition temperature (Tg) of the resin for core. Unless the cooling is performed until the temperature reaches a temperature lower than the glass transition temperature (Tg) of the resin for core, coarse particles are generated when an aggregation agent is added in the adhesion process described below. A specific cooling rate is 0.1 to 50° C./minute.

Then, the shell particles A for use in the invention are described.

As the shell particles A for use in the invention, arbitrary particles can be used insofar as the median diameter based on the volume is smaller than that of the core particles B described above. The median diameter based on the volume of the shell particles A can be measured by the use of a dynamic light scattering particle size distribution meter (Nanotrack: manufactured by Nikkiso).

The resin fine particles for shell which are the shell particles A are prepared by known methods. For example, in the case of a resin fine particle dispersion liquid containing resin fine particles containing a vinyl monomer, particularly a styrene monomer, as a constituent element, the resin fine particle dispersion liquid can be prepared by carrying out emulsification polymerization of the monomer using a surfactant. In the case of resin (e.g., polyester resin) produced by another method, a dispersion liquid of the resin fine particles for shell can be produced by melting the resin in a solvent therefor when the resin is an oil-based substance and dissolves in a solvent having relatively low solubility in water, dissolving into particles in an aqueous medium by a dispersing machine, such as a homogenizer, together with a surfactant and a polymer electrolyte, and then heating or decompressing the same to remove the solvent.

It is suitable to add an aqueous medium and a surfactant to the resin for shell, and then carry out emulsification dispersion in an aqueous medium substantially not containing an organic solvent by a dispersing machine of applying a high-speed shearing force, such as Clearmix, a homomixer, or a homogenizer, while heating the mixture to a temperature equal to or higher than the softening temperature of the resin for shell. In particular, it is suitable that the content of an organic solvent having a boiling point of 100° C. or lower is 100 µg/g or lower. When the content of the organic solvent is within the above-mentioned range, the load of the process for removing and collecting the organic solvent is reduced or the process is not required when manufacturing toner.

The shape of the shell particles A is suitably a spherical shape. It is suitable that the spherical shape is achieved by heat treatment at a temperature equal to or higher than the glass transition temperature (Tg) of the resin for shell. Thus, when forming the core-shell structure, the shell particles easily uniformly cover the core particles.

As the resin for shell, arbitrary resin can be used. Among the resins, polyester resin is particularly suitable which has sharp melt properties and has excellent intensity even when it has a low molecular weight.

Moreover, it is suitable for the resin for shell to have an ionic group, such as a carboxylic acid group, a sulfonic acid group, and an amino group in the resin skeleton, and it is more suitable for the resin for shell to have a carboxylic acid group. The acid value of the resin for shell is suitably 3 mgKOH/g or more and 35 mgKOH/g or lower and more suitably 3 mgKOH/g or more and 15 mgKOH/g or lower. Due to the fact that the acid value of the resin for shell is within the above-mentioned range, the blocking characteristics and the chargeability under a high humidity environment of the core-shell structure fine particles can be further increased. When the acid value of the shell particles A is 3 mgKOH/g or more and 15 mgKOH/g or lower, the dispersion stability in an aqueous medium of the shell particles A becomes a little low, so that it becomes more difficult to produce uniform core-shell structure fine particles. However, the core-shell structure fine particles can be manufactured by a method described below. The acid value of the resin for shell was measured by the same method as that of the acid value of the resin for core.

The glass transition temperature (Tg2) of the resin for shell is suitably 60° C. or higher and 80° C. or lower and more suitably 65° C. or higher and 80° C. or lower. Due to the fact that the glass transition temperature (Tg2) of the resin for shell is within the above-mentioned range, the heat-resistant storageability and the fixability can be further increased.

The relationship between the glass transition temperature (Tg1) of the resin for core and the glass transition temperature (Tg2) of the resin for shell is suitably Tg1<Tg2. When Tg1 and Tg2 are excessively close to each other, the shell and the core are easily mixed during fusion, so that the core is likely to shift to the particle surface. Therefore, Tg1+5 (° C.)<Tg2 is more suitable.

The surfactant for use in the emulsification of the shell particles A is not particularly limited, and the following substances are specifically mentioned.

Mentioned are anionic surfactants, such as a sulfate type, a sulfonate type, a carboxylate type, a phosphate type, and a soap; cationic surfactants, such as an amine salt type and a quaternary ammonium salt type; and nonionic surfactants, such as a polyethylene glycol type, an alkyl phenol ethylene oxide adduct type, and a polyvalent alcohol type. The surfactants may be used singly or in combination of two or more thereof. In the invention, it is suitable to use the carboxylate surfactant due to the reasons described below.

The median diameter based on the volume of the shell particles A is suitably 0.05 to 0.4 µm and more suitably 0.08 to 0.3 µm. Due to the fact that the median diameter based on the volume of the shell particles A is within the above-mentioned range, the shell layer does not become excessively thick, and therefore the fixability can be further increased.

Then, a process for obtaining the core-shell structure of the invention is described. The process for obtaining the core-shell structure of the invention is a process for dispersing the shell particles A and the core particles B described above in an aqueous medium, and then adding metal salt thereto to thereby attach the shell particles A to the core particles B. The addition of the metal salt may be performed by adding the same to a dispersion of the core particles B beforehand.

Before adding the metal salt, the shell particles A and the core particles B are present in a state where the particles are dispersed in the aqueous medium due to charges thereof or the charges of the surfactant which disperses the particles. By adding the metal salt thereto, the charges are shielded. As a result, the shell particles A and the core particles B are put into an unstable dispersion state. Thus, the shell particles A adhere to the surface of each of the core particles B, so that the core-shell structure fine particles are formed.

In the invention, in order to manufacture the core-shell structure fine particles, the shell particles A and the core particles B need to satisfy the following relationships (1) to (3).

(1) The zeta potential of the core particles B and the zeta potential of the shell particles A are the same polarity.
(2) |Zeta potential of the core particles B when adding metal salt|<|Zeta potential of the shell particles A when adding metal salt|
(3) (Median diameter based on the volume of the core particles B)>(Median diameter based on the volume of the shell particles A).

When not satisfying the relationship of |Zeta potential of the core particles B when adding metal salt|<|Zeta potential of the shell particles A when adding metal salt|, the dispersion state of the shell particles A becomes more unstable than that of the core particles B, so that aggregation is likely to occur between the shell particles A. Therefore, it becomes difficult to form a uniformly covered core-shell structure. The "zeta potential of the shell particles A when adding metal salt" refers to the zeta potential of the shell particles A in the aqueous medium after adding the metal salt. Similarly, the "zeta potential of the core particles B when adding metal salt" refers to the zeta potential of the core particles B in the aqueous medium after adding the metal salt.

The measurement of the zeta potential thereof is performed as follows.

i) Measuring of Zeta Potential of Shell Particles A

An aqueous medium in which the shell particles A are dispersed is prepared in the same manner as in the preparation of the aqueous medium in which the shell particles A and the core particles B are dispersed, except not compounding the core particles B. Metal salt is added to the aqueous medium in such a manner as to achieve the same concentration as the concentration when manufacturing the core-shell structure fine particles. Then, the zeta potential of the shell particles A in the aqueous medium after adding the metal salt is measured.

ii) Measuring of Zeta Potential of Core Particles B

An aqueous medium in which the core particles B are dispersed is prepared in the same manner as in the preparation of the aqueous medium in which the shell particles A and the core particles B are dispersed, except not compounding the shell particles A. Metal salt is added to the aqueous medium in such a manner as to achieve the same concentration as the concentration when manufacturing the core-shell structure fine particles. Then, the zeta potential of the core particles B in the aqueous medium after adding the metal salt is measured.

When the shell particles A are resin fine particles manufactured by applying shearing force under the conditions of substantially not using a solvent, this tendency becomes more remarkable, so that only aggregation of the shell particles A sometimes occur. Although the reason therefor is not certain, it is considered that when the shell particles A manufactured by applying shearing force without using a solvent are manufactured, the charges of the surface of the shell particles A are not uniform, which is likely to cause the aggregation between the shell particles A.

Irrespective of whether the polarity of the zeta potential is negative polarity or positive polarity, the formation of the core-shell structure can be achieved by controlling the degree (large or small) of the absolute value but the polarity needs to be the same. When the zeta potential of the core particles B and the zeta potential of the shell particles A are different from each other, the core-shell structure fine particles are formed but the core-shell structure fine particles formed by the core and the shell which are different in chargeability are obtained. Therefore, the charging stability of the core-shell structure fine particles becomes unstable.

It is more suitable to also satisfy the relationship of |Zeta potential of the shell particles A when adding metal salt|<|Zeta potential of the core particles B when adding metal salt|+20 mV. Due to the fact that the shell particles A and the core particles B satisfy the relationship, the aggregation of the shell particles A and the core particles B more appropriately proceeds. Therefore, it becomes possible to obtain the core-shell structure fine particles in which the core particles are more uniformly covered with the shell particles and the particle size is suitable as toner. The zeta potential can be measured by a zeta potential meter (ELS-Z2: manufactured by Otsuka Electronics Co., Ltd.).

The zeta potential of the shell particles A and the zeta potential of the core particles B when adding metal salt can be controlled by charges of the shell particles A and the core particles B, the type and the addition amount of surfactants for use in manufacturing the shell particles A and the core particles B, the type and addition amount of metal salt to be added, and the pH in the aqueous medium.

Usable as the metal salt are metal salts of monovalent metals, such as sodium and potassium, metal salts of divalent metals, such as calcium and magnesium; metal salts of trivalent metals, such as iron and aluminum. Among the above, it is suitable to use calcium salt or magnesium salt from the viewpoint of controlling the zeta potential. By the use of calcium salt and magnesium salt, the absolute value of the zeta potential of the core particles B easily decreases, so that the relationship of |Zeta potential of the core particles B when adding metal salt|<|Zeta potential of the shell particles A when adding metal salt| is easily satisfied.

Moreover, it is also suitable to remove a monovalent anion in a core solution and a shell solution for satisfying the relationship of |Zeta potential of the core particles B when adding metal salt|<|Zeta potential of the shell particles A when adding metal salt|. Specifically, it is suitable to remove a surfactant, an aggregation agent, and an aggregation stop agent by ultrafiltration treatment or dialysis treatment.

It is suitable that a surfactant containing carboxylic acid or carboxylic acid salt is adsorbed to the shell particles A and a surfactant containing sulfonic acid salt is adsorbed to the core particles B for satisfying the relationship of |Zeta potential of the core particles B when adding metal salt|<|Zeta potential of the shell particles A when adding metal salt|. To that end, it is suitable to use the surfactant containing carboxylic acid or carboxylic acid salt as an emulsifier during emulsification of the shell particles A and use the surfactant containing sulfonic acid salt as an emulsifier during emulsification of fine particles forming the core particles B.

Although the reason therefor is not certain, it is considered that the adsorption amount of the surfactant containing sulfonic acid salt to the particles is smaller and a reduction in the zeta potential when adding metal salt is more likely to occur as compared with the surfactant containing carboxylic acid or carboxylic acid salt. As a result, it is assumed that the above-described relationship is easily satisfied.

It is suitable for the ratio of the addition amount of the shell particles A to the addition amount of the core particles B (% by mass) to satisfy the following relationship (4).

(4) (Proportion of the addition amount of the shell particles A (% by mass))>[{(Median diameter based on the volume of the shell particles A (μm))/(Median diameter based on the volume of the core particles B (μm))}×400]

When satisfying the relationship (4) above, the shell particles A are added with an amount with which one or more shell layers are substantially covered relative to the surface area of the core particles B. Therefore, uniform core-shell structure fine particles in which the core exposed portion is small can be obtained.

It is suitable for the ratio of the addition amount of the shell particles A to the addition amount of the core particles B to further satisfy the following relationship (4').

(4') (Proportion of the addition amount of the shell particles A (% by mass))>{(Median diameter based on the volume of the shell particles A (μm))/(Median diameter based on the volume of the core particles B (μm))}×800]

When satisfying the relationship (4') above, the shell particles A are added with an amount with which two or more shell layers are substantially covered relative to the surface area of the core particles B. Therefore, uniform core-shell structure fine particles in which the core exposed portion is smaller can be obtained.

When using the core-shell structure fine particles as toner, it is suitable to attach the shell particles A to each of the core particles B, and then adhere the shell particles A to each of the core particles B by melting thereof. By performing this operation, the low-temperature fixability as toner can be further increased.

By heating the same to a temperature equal to or higher than the glass transition temperature (Tg1) of the resin for core for fusing, the resin contained in the core and the resin contained in the shell are sufficiently bonded, so that the removal of the shell from the core in the operation of washing, filtration, and the like described below can be suppressed. Before adhering the shell particles A to each of the core particles B by melting thereof, in order to prevent adhering the completed core-shell structure fine particles each other, a chelating agent, a pH adjuster, and a surfactant can be put therein as appropriate.

The heating temperature may be between the glass transition temperature (Tg1) of the resin for core and a temperature at which the resin undergoes thermal cracking. The heating and fusion time may be short when the heating temperature is high and needs to be long when the heating temperature is low. More specifically, since the heating and fusion time is dependent on the heating temperature, the time cannot be generally specified but is generally 10 minutes to 10 hours.

By adhering the shell particles A to each of the core particles B by melting thereof, and then cooling the same to room temperature under appropriate conditions, followed by washing, filtration, and drying, toner particle which are the core-shell structure fine particles can be obtained. Furthermore, an external additive may be added to the surface of the obtained toner particles. Mentioned as the external additive are inorganic particles, such as silica, alumina, titania, and calcium carbonate and resin particles, such as vinyl resin, polyester resin, and silicone resin. As a method for adding the externally-applied agent, the external additive can be externally applied to toner particles by applying shearing force in a dried state. These external additive function as a fluidity auxiliary agent or a cleaning auxiliary agent.

The median diameter based on the volume of the toner of the invention is suitably 3.0 to 10.0 μm, more suitably 4.0 to 7.0 μm, and most suitably 5.0 to 7.0 μm. Due to the fact that the median diameter based on the volume of the toner is within the above-mentioned range, it becomes easier to obtain good chargeability and high definition.

EXAMPLES

Hereinafter, the invention is described in more detail with reference to Examples and Comparative Examples but the aspects of the invention are not limited thereto. Manufacturing of dispersion liquid of resin fine particles for core 1

0.15 part by mass of a sulfonic acid type anionic surfactant (manufactured by DAI-ICHI KOGYO SEIYAKU Co., Ltd.: NEOGEN RK) and 3.15 parts by mass of N,N-dimethylaminoethanol (basic substance) were dissolved in 146.70 parts by mass of ion exchanged water (aqueous medium) to prepare a dispersion medium. This dispersion medium was placed in a 350 ml pressure-resistant stainless steel container with a round bottom. Then, 150 parts by mass of a pulverized substance (Diameter of 1 to 2 mm) of "polyester resin A" (Composition (molar ratio)/polyoxypropylene(2.2)-2,2-bis(4-hydroxyphenyl)propane:polyoxyethylene(2.0)-2,2-bis(4-hydroxyphenyl)propane:terephthalic acid:fumaric acid:trimellitic acid=25:25:26:20:4), Mn=3,500, Mw=10,300, Mw/Mn=2.9, Tm=96° C., Tg=56° C., Acid value=12 mgKOH/g) was put therein, and then mixed.

Next, a high-speed shearing emulsifier, Clearmix (manufactured by M TECHNIQUE Co., Ltd.: CLM-2.2S), was hermetically connected to the pressure-resistant stainless steel container with a round bottom. The mixture in the container was sheared and dispersed at a rotation number of the rotor of the Clearmix of 18,000 r/min for 30 minutes while being warmed and pressurized to 115.0° C. and 0.18 MPa, respectively. Thereafter, cooling was carried out at a cooling rate of 2.0° C./min while maintaining the rotation of 18,000 r/min until the temperature of the mixture reached 50.0° C. to thereby obtain a dispersion liquid of resin fine particles for core 1. The median diameter based on the volume of the resin particles for core in the dispersion liquid of resin fine particles for core 1 was 0.22 μm as a result of measuring using a dynamic light scattering particle size distribution meter (Nanotrack: manufactured by Nikkiso).

Manufacturing of Dispersion Liquid of Resin Fine Particles for Shell 1

2.40 parts by mass of a carboxylic acid type anionic surfactant (manufactured by DAI-ICHI KOGYO SEIYAKU Co., Ltd.: SN-1) and 8.10 parts by mass of N,N-diethyl amino ethanol (basic substance) were dissolved in 169.50 parts by mass of ion exchanged water (aqueous medium) to prepare a dispersion medium. This dispersion medium was placed in a 350 ml pressure-resistant stainless steel container with a round bottom. Subsequently, 120 parts by mass of polyester resin C (Composition (molar ratio)/polyoxypropylene(2.2)-2, 2-bis(4-hydroxyphenyl)propane:ethylene glycol: terephthalic acid:maleic acid:trimellitic acid=35: 15:33:15:2), Mn=4,600, Mw=16,500, Mp=10,400, Mw/Mn=3.6, Tm=117° C., Tg=67° C., Acid value=13 mgKOH/g) were put therein, and then mixed.

Next, a high-speed shearing emulsifier, Clearmix (manufactured by M TECHNIQUE Co., Ltd.: CLM-2.2S), was hermetically connected to the pressure-resistant stainless steel container with a round bottom. The mixture in the container was sheared and dispersed at a rotation number of the rotor of the Clearmix of 18,000 r/min for 30 minutes while being warmed and pressurized to 140.0° C. and 0.18 MPa, respectively. Thereafter, cooling was carried out at a cooling rate of 2.0° C./min while maintaining the rotation of 18,000 r/min until the temperature of the mixture reached 55.0° C. to thereby obtain a dispersion liquid of resin fine particles for shell 1. The median diameter based on the volume of the resin fine particles for shell in the dispersion liquid of resin fine particles for shell 1 was 0.25 μm as a result of measuring using a dynamic light scattering particle size distribution meter (Nanotrack: manufactured by Nikkiso).

Manufacturing of Dispersion Liquid of Resin Fine Particles for Shell 2

A dispersion liquid of resin fine particles for shell 2 was obtained by the same method, except changing the addition amount of the carboxylic acid type anionic surfactant (manufactured by DAI-ICHI KOGYO SEIYAKU Co., Ltd.: SN-1) to 1.80 parts by mass and the addition amount of ion exchanged water (aqueous medium) to 170.10 parts by mass described in the manufacturing of the dispersion liquid of resin fine particles for shell 1. The median diameter based on the volume of the resin fine particles for shell in the dispersion liquid of resin fine particles for shell 2 was 0.35 μm as a result of measuring using a dynamic light scattering particle size distribution meter (Nanotrack: manufactured by Nikkiso).

Manufacturing of Dispersion Liquid of Resin Fine Particles for Shell 3

A dispersion liquid of resin fine particles for shell 3 was obtained by the same method, except changing the carboxylic acid type anionic surfactant (manufactured by DAI-ICHI KOGYO SEIYAKU Co., Ltd.: SN-1) described in the manufacturing of the dispersion liquid of resin fine particles for shell 1 to a carboxylic acid type anionic surfactant (manufactured by DAI-ICHI KOGYO SEIYAKU Co., Ltd.: MN-1). The median diameter based on the volume of the resin fine particles for shell in the dispersion liquid of resin fine particles for shell 3 was 0.29 μm as a result of measuring using a dynamic light scattering particle size distribution meter (Nanotrack: manufactured by Nikkiso).

Manufacturing of dispersion liquid of resin fine particles for shell 4

2.40 parts by mass of a carboxylic acid type anionic surfactant (manufactured by DAI-ICHI KOGYO SEIYAKU Co., Ltd.: SN-1) and 11.90 parts by mass of N,N-diethyl amino ethanol (basic substance) were dissolved in 165.70 parts by mass of ion exchanged water (aqueous medium) to prepare a dispersion medium. This dispersion medium was placed in a 350 ml pressure-resistant stainless steel container with a round bottom. Subsequently, 120 parts by mass of polyester resin D (Composition (molar ratio)/ polyoxypropylene(2.2)-2,2-bis(4-hydroxyphenyl)propane: ethylene-glycol:terephthalic acid:maleic acid: trimellitic acid=34:15:32:15:4), Mn=4,600, Mw=16,500, Mp=10,400, Mw/Mn=3.6, Tm=117° C., Tg=67° C., Acid value=19 mgKOH/g) were put therein, and then mixed.

Next, a high-speed shearing emulsifier, Clearmix (manufactured by M TECHNIQUE Co., Ltd.: CLM-2.2S), was hermetically connected to the pressure-resistant stainless steel container with a round bottom. The mixture in the container was sheared and dispersed at a rotation number of the rotor of the Clearmix of 18,000 r/min for 30 minutes while being warmed and pressurized to 140.0° C. and 0.18 MPa, respectively. Thereafter, cooling was carried out at a cooling rate of 2.0° C./min while maintaining the rotation of 18,000 r/min until the temperature of the mixture reached 55.0° C. to thereby obtain a dispersion liquid of resin fine particles for shell 4. The median diameter based on the volume of the resin particles for shell 4 in the dispersion liquid of resin fine particles for shell 4 was 0.10 μm as a result of measuring using a dynamic light scattering particle size distribution meter (Nanotrack: manufactured by Nikkiso).

Manufacturing of Dispersion Liquid of Resin Fine Particles for Shell 5

| Polyester resin C | 60 parts by mass |
| Anionic surfactant (manufactured by DAI-ICHI KOGYO SEIYAKU Co., Ltd.: NEOGEN RK) | 0.30 parts by mass |
| N,N-dimethylaminoethanol | 1.90 parts by mass |
| Tetrahydrofuran (manufactured by WakoPure Chemical Ind. Ltd.) | 200 parts by mass |

These substances mentioned above were mixed and dissolved, and then stirred at 4000 rpm using a ultlrahigh speed stirrer T. K. ROBOMIX (manufactured by PRIMIX Corporation). Furthermore, 177.80 parts by mass of ion exchanged water was added dropwise, and thereafter the tetrahydrofuran was removed using an evaporator to thereby obtain a dispersion liquid of resin fine particles for shell 5.

The median diameter based on the volume of the resin fine particles for shell in the dispersion liquid of resin fine particles for shell 5 was 0.09 μm as a result of measuring using a dynamic light scattering particle size distribution meter (Nanotrack: manufactured by Nikkiso).

Manufacturing of dispersion liquid of resin fine particles for shell 6

A dispersion liquid of resin fine particles for shell 6 was obtained by the same method, except changing the carboxylic acid type anionic surfactant (manufactured by DAI-ICHI KOGYO SEIYAKU Co., Ltd.: SN-1) described in the manufacturing of the dispersion liquid of resin fine particles for shell 1 to a sulfonic acid type anionic surfactant (manufactured by DAI-ICHI KOGYO SEIYAKU Co., Ltd.: NEOGEN RK). The median diameter based on the volume of the resin fine particles for shell in the dispersion liquid of resin fine particles for shell 6 was 0.25 μm as a result of measuring using a dynamic light scattering particle size distribution meter (Nanotrack: manufactured by Nikkiso).

Manufacturing of Dispersion Liquid of Resin Fine Particles for Shell 7

A dispersion liquid of resin fine particles for shell 7 was obtained by the same method, except changing the addition amount of the sulfonic acid type anionic surfactant (manufactured by DAI-ICHI KOGYO SEIYAKU Co., Ltd.: NEOGEN RK) to 4.20 parts by mass and the addition amount of ion exchanged water (aqueous medium) to 167.70 parts by mass described in the manufacturing of the dispersion liquid of resin fine particles for shell 6. The median diameter based on the volume of the resin fine particles for shell in the dispersion liquid of resin fine particles for shell 7 was 0.30 μm as a result of measuring using a dynamic light scattering particle size distribution meter (Nanotrack: manufactured by Nikkiso).

Aqueous Dispersion Liquid of Coloring Agent Fine Particles

| Cyan pigment (manufactured by Dainichiseika Color & Chemicals Mfg. Co., Ltd company: Pigment Blue 15:3) | 100 parts by mass |
| Anionic surfactant (manufactured by DAI-ICHI KOGYO SEIYAKU Co., Ltd.: NEOGEN RK) | 15 parts by mass |
| Ion exchanged water | 885 parts by mass |

These substances mentioned above were mixed and dissolved, and then dispersed for about 1 hour using a high-pressure collision type dispersing machine, Nanomizer (Manufactured by Yoshida Kikai Co., Ltd.) to prepare an aqueous dispersion liquid of coloring agent fine particles in which a coloring agent was dispersed. The median diameter based on the volume of the coloring agent fine particles in the aqueous dispersion liquid of coloring agent fine particles was 0.20 μm as a result of measuring using a dynamic light scattering particle size distribution meter (Nanotrack: manufactured by Nikkiso).

Aqueous Dispersion Liquid of Mold Release Agent Particles

| | |
|---|---|
| Ester wax (behenic acid behenyl, melting point of 75° C.) | 100 parts by mass |
| Anionic surfactant (manufactured by DAI-ICHI KOGYO SEIYAKU Co., Ltd.: NEOGEN RK) | 10 parts by mass |
| Ion exchanged water | 880 parts by mass |

The substances mentioned above were put in a mixing vessel with a stirrer, heated to 90° C., stirred under the conditions of a rotor rotation number of 19,000 rpm and a screen rotation number of 19,000 rpm at a shearing stirring portion with a rotor outer diameter of 3 cm and a clearance of 0.3 mm while circulating to Clearmix W motion (manufactured by M TECHNIQUE Co., Ltd.), subjected to dispersion treatment for 60 minutes, and then cooled to 40° C. under the cooling conditions of a rotor rotation number of 1000 rpm, a screen rotation number of 0 rpm, and a cooling rate of 10° C./min to thereby obtain an aqueous dispersion liquid of mold release agent fine particles. The median diameter based on the volume of the mold release agent fine particles in the aqueous dispersion liquid of mold release agent fine particles was 0.15 μm as a result of measuring using a dynamic light scattering particle size distribution meter (Nanotrack: manufactured by Nikkiso).

Production of Core Particle Dispersion Liquid 1

| | |
|---|---|
| Dispersion liquid of resin fine particles for core 1 | 40 parts by mass |
| Aqueous dispersion liquid of coloring agent fine particles | 10 parts by mass |
| Aqueous dispersion liquid of mold release agent particles | 20 parts by mass |
| Aqueous 1% by mass magnesium sulfate solution | 20 parts by mass |
| Ion exchanged water | 140 parts by mass |

The substances mentioned above were dispersed using a homogenizer (manufactured by IKA: ULTRATALAX T50), and then heated while stirring with a stirring blade to 45° C. in a water bath for heating. After holding at 45° C. for 1 hour, the resultant substance was observed under an optical microscope. Then, it was confirmed that aggregated particles having an average particle size of about 5.5 μm was formed. 40 parts by mass of an aqueous 5% by mass trisodium citrate solution was added, the temperature was increased to 85° C. while continuing the stirring, and then the temperature was maintained for 120 minutes to fuse the core particle. Subsequently, water was put in the water bath while continuing the stirring to reduce the temperature to 25° C. to thereby obtain a core particle dispersion liquid 1. When the particle size of the core particles in the core particle dispersion liquid 1 was measured by a particle size distribution analyzer (COULTER MULTISIZER III: manufactured by Coulter) by the Coulter method, the median diameter based on the volume of the core particles in the core particle dispersion liquid 1 was 5.5 μm.

Production of Core Particle Dispersion Liquid 2

450 parts by mass of an aqueous 0.1 M-$Na_3PO_4$ solution was put in 700 parts by mass ion exchanged water, the mixture was warmed to 50° C., and then the mixture was stirred at 10,000 rpm using a TK type homomixer (manufactured by Tokushukika Kogyo). 70 parts by mass of an aqueous 1.0 M-$CaCl_2$ solution was gradually added thereto to thereby obtain an aqueous medium containing calcium phosphate salt.

| Monomer | |
|---|---|
| Styrene | 170 parts by mass |
| n-butyl acrylate | 30 parts by mass |
| Acrylic acid | 20 parts by mass |
| Coloring agent | |
| C.I. pigment blue 15:3 | 15 parts by mass |
| Charge control agent | |
| Salicylic acid metallic compound | 2 parts by mass |
| Polar resin | |
| Saturated polyester (Acid value of 10 mg KOH/g, Peak molecular weight; 15,000) | 20 parts by mass |
| Mold release agent | |
| Behenyl stearate | 30 parts by mass |
| Crosslinking agent | |
| Divinylbenzene | 0.3 part by mass |

Separately, the formulation above was warmed to 50° C., and then uniformly dissolved and dispersed at 9000 rpm using a TK type homomixer (manufactured by Tokushukika Kogyo). 5 parts by mass of a polymerization initiator, 2,2'-azobis (2,4-dimethylvaleronitrile), was dissolved therein to prepare a polymerizable monomer composition.

The polymerizable monomer composition was put in the aqueous medium, and then stirred at 8000 rpm by a TK type homomixer under a $N_2$ atmosphere at 50° C. to granulate the polymerizable monomer composition.

Thereafter, the temperature was increased to 60° C. in 2 hours while stirring with a paddle stirring blade. Then, 4 hours later, the temperature of the resultant substance was increased to 80° C. at a temperature elevation rate of 40° C./Hr, and then reacted for 4 hours. After the completion of the polymerization reaction, a residual monomer was distilled off under reduced pressure, followed by cooling. Thereafter, hydrochloric acid was added to dissolve calcium phosphate salt, and then the dispersion was filtered and washed with water. Furthermore, 1 part by mass of a sulfonic acid type anionic surfactant (manufactured by DAI-ICHI KOGYO SEIYAKU Co., Ltd.: NEOGEN RK) was added to the core particles, and then stirred to thereby obtain a core particle dispersion liquid 2 with a concentration of 10% by mass.

When the particle size of the core particles in the core particle dispersion liquid 2 was measured by a particle size distribution analyzer (COULTER MULTISIZER III: manufactured by Coulter) by the Coulter method, the median diameter based on the volume of the core particles in the core particle dispersion liquid 2 was 6.0 μm.

Example 1

1000 parts by mass of the core particle dispersion liquid 1 was placed in a tall beaker, and then stirred with a stirring blade at 25° C. in a water bath for heating. Subsequently, 113 parts by mass of the dispersion liquid of resin fine particles for shell 1 was added, and then stirred for 10 minutes. Furthermore, 200 parts by mass of an aqueous 2% by mass calcium chloride solution was slowly added dropwise. The dispersion liquid in this stage is referred to as a dispersion liquid A.

In this state, a small amount of the liquid was extracted as required, filtered through a 2 μm microfilter. Then, the stirring was continued at 25° C. until the filtrate became transparent. After confirming that the filtrate became transparent, the temperature was increased to 40° C., 133 parts by mass of an aqueous 5% by mass trisodium citrate solution was added, the temperature was increased to 65° C., and then the mixture was stirred for 1.5 hours. Thereafter, the obtained liquid was cooled to 25° C., followed by filtration and solid liquid separation. Thereafter, 800 parts by mass of ion exchanged water was added to the solid, and then stirred and washed for 30 minutes. Thereafter, filtration and solid liquid separation were performed again. In order to eliminate the influence of the remaining surfactant, filtration and washing were repeated as described above until the electrical conductivity of the filtrate reached 150 μS/cm or lower. Next, the obtained solid was dried to thereby obtain core-shell structure toner particles 1 of Example 1. The median diameter based on the volume of the obtained core-shell structure toner particles 1 was 5.6 μm. Separately, a dispersion liquid A' similar to the dispersion liquid A was similarly prepared, except using the core particle dispersion liquid 1 to which core particles were not added. Then, the "zeta potential of the shell particles A when adding metal salt" was measured, the zeta potential of the shell particles was −43 mV. Similarly, a dispersion liquid A" similar to the dispersion liquid A was similarly prepared, except using the shell particle dispersion liquid 1 to which shell particles are not added. Then, the zeta potential of the core particles B when adding metal salt" was measured, the zeta potential of the core particles was −25 mV. For the measurement of the zeta potential, a zeta potential meter ELS-Z2 (manufactured by Otsuka Electronics Co., Ltd.) was used.

Example 2

1000 parts by mass of the core particle dispersion liquid 1 was placed in a tall beaker, and then stirred with a stirring blade at 25° C. in a water bath for heating. Then, 75 parts by mass of the dispersion liquid of resin fine particles for shell 1 were added, and stirred for 10 minutes. Furthermore, 190 parts by mass of an aqueous 2% by mass calcium chloride solution was slowly added dropwise.

In this state, a small amount of the liquid was extracted as required, filtered through a 2 μm microfilter. Then, the stirring was continued at 25° C. until the filtrate became transparent. After confirming that the filtrate became transparent, the temperature was increased to 40° C., 127 parts by mass of an aqueous 5% by mass trisodium citrate solution was added, the temperature was increased to 65° C., and then the mixture was stirred for 1.5 hours. Thereafter, the obtained liquid was cooled to 25° C., followed by filtration and solid liquid separation. Thereafter, 800 parts by mass of ion exchanged water was added to the solid, and then stirred and washed for 30 minutes. Thereafter, filtration and solid liquid separation were performed again. In order to eliminate the influence of the remaining surfactant, filtration and washing were repeated as described above until the electrical conductivity of the filtrate reached 150 μS/cm or lower. Next, the obtained solid was dried to thereby obtain core-shell structure toner particles 2 of Example 2. The median diameter based on the volume of the obtained core-shell structure toner particles 2 was 5.7 μm. The zeta potential of the core particles and the zeta potential of the shell particles measured in the same manner as in Example 1 were −26 mV and −44 mV, respectively.

Example 3

1000 parts by mass of the core particle dispersion liquid 1 was placed in a tall beaker, and then stirred with a stirring blade at 25° C. in a water bath for heating. Subsequently, 38 parts by mass of the dispersion liquid of resin fine particles for shell 1 was added, and then stirred for 10 minutes. Furthermore, 180 parts by mass of an aqueous 2% by mass calcium chloride solution was slowly added dropwise.

In this state, a small amount of the liquid was extracted as required, filtered through a 2 μm microfilter. Then, the stirring was continued at 25° C. until the filtrate became transparent. After confirming that the filtrate became transparent, the temperature was increased to 40° C., 120 parts by mass of an aqueous 5% by mass trisodium citrate solution was added, the temperature was increased to 65° C., and then the mixture was stirred for 1.5 hours. Thereafter, the obtained liquid was cooled to 25° C., followed by filtration and solid liquid separation. Thereafter, 800 parts by mass of ion exchanged water was added to the solid, and then stirred and washed for 30 minutes. Thereafter, filtration and solid liquid separation were performed again. In order to eliminate the influence of the remaining surfactant, filtration and washing were repeated as described above until the electrical conductivity of the filtrate reached 150 μS/cm or lower. Next, the obtained solid was dried to thereby obtain core-shell structure toner particles 3 of Example 3. The median diameter based on the volume of the obtained core-shell structure toner particles 3 was 5.8 μm. The zeta potential of the core particles and the zeta potential of the shell particles measured in the same manner as in Example 1 were −27 mV and −46 mV, respectively.

Example 4

1000 parts by mass of the core particle dispersion liquid 1 was placed in a tall beaker, and then stirred with a stirring blade at 25° C. in a water bath for heating. Subsequently, 75 parts by mass of the dispersion liquid of resin fine particles for shell 2 was added, and then stirred for 10 minutes. Furthermore, 166 parts by mass of an aqueous 2% by mass calcium chloride solution was slowly added dropwise.

In this state, a small amount of the liquid was extracted as required, filtered through a 2 μm microfilter. Then, the stirring was continued at 25° C. until the filtrate became transparent. After confirming that the filtrate became transparent, the temperature was increased to 40° C., 111 parts by mass of an aqueous 5% by mass trisodium citrate solution was added, the temperature was increased to 65° C., and then the mixture was stirred for 1.5 hours. Thereafter, the obtained liquid was cooled to 25° C., followed by filtration and solid liquid separation. Thereafter, 800 parts by mass of ion exchanged water was added to the solid, and then stirred and washed for 30 minutes. Thereafter, filtration and solid liquid separation were performed again. In order to eliminate the influence of the remaining surfactant, filtration and washing were repeated as described above until the electrical conductivity of the filtrate reached 150 μS/cm or lower. Next, the obtained solid was dried to thereby obtain core-shell structure toner particles 4 of Example 4. The median diameter based on the volume of the obtained core-shell structure toner particles 4 was 5.8 μm. The zeta potential of the core particles and the zeta potential of the shell particles measured in the same manner as in Example 1 were −29 mV and −48 mV, respectively.

Example 5

1000 parts by mass of the core particle dispersion liquid 1 was placed in a tall beaker, and then stirred with a stirring blade at 25° C. in a water bath for heating. Subsequently, 38 parts by mass of the dispersion liquid of resin fine particles for shell 1 was added, and then stirred for 10 minutes. Furthermore, 250 parts by mass of an aqueous 2% by mass magnesium sulfate solution was slowly added dropwise.

In this state, a small amount of the liquid was extracted as required, filtered through a 2 µm microfilter. Then, the stirring was continued at 25° C. until the filtrate became transparent. After confirming that the filtrate became transparent, the temperature was increased to 40° C., 120 parts by mass of an aqueous 5% by mass trisodium citrate solution was added, the temperature was increased to 65° C., and then the mixture was stirred for 1.5 hours. Thereafter, the obtained liquid was cooled to 25° C., followed by filtration and solid liquid separation. Thereafter, 800 parts by mass of ion exchanged water was added to the solid, and then stirred and washed for 30 minutes. Thereafter, filtration and solid liquid separation were performed again. In order to eliminate the influence of the remaining surfactant, filtration and washing were repeated as described above until the electrical conductivity of the filtrate reached 150 µS/cm or lower. Next, the obtained solid was dried to thereby obtain core-shell structure toner particles 5 of Example 5. The median diameter based on the volume of the obtained core-shell structure toner particles 5 was 5.8 µm. The zeta potential of the core particles and the zeta potential of the shell particles 1 measured in the same manner as in Example 1 were −27 mV and −36 mV, respectively.

Example 6

1000 parts by mass of the core particle dispersion liquid 1 was placed in a tall beaker, and then stirred with a stirring blade at 25° C. in a water bath for heating. Subsequently, 38 parts by mass of the dispersion liquid of resin fine particles for shell 3 was added, and then stirred for 10 minutes. Furthermore, 166 parts by mass of an aqueous 2% by mass calcium chloride solution was slowly added dropwise.

In this state, a small amount of the liquid was extracted as required, filtered through a 2 µm microfilter. Then, the stirring was continued at 25° C. until the filtrate became transparent. After confirming that the filtrate became transparent, the temperature was increased to 40° C., 111 parts by mass of an aqueous 5% by mass trisodium citrate solution was added, the temperature was increased to 65° C., and then the mixture was stirred for 1.5 hours. Thereafter, the obtained liquid was cooled to 25° C., followed by filtration and solid liquid separation. Thereafter, 800 parts by mass of ion exchanged water was added to the solid, and then stirred and washed for 30 minutes. Thereafter, filtration and solid liquid separation were performed again. In order to eliminate the influence of the remaining surfactant, filtration and washing were repeated as described above until the electrical conductivity of the filtrate reached 150 µS/cm or lower. Next, the obtained solid was dried to thereby obtain core-shell structure toner particles 6 of Example 6. The median diameter based on the volume of the obtained core-shell structure toner particles 6 was 5.8 µm. The zeta potential of the core particles and the zeta potential of the shell particles measured in the same manner as in Example 1 were −25 mV and −40 mV, respectively.

Example 7

1000 parts by mass of the core particle dispersion liquid 1 was placed in a tall beaker, and then stirred with a stirring blade at 25° C. in a water bath for heating. Subsequently, 38 parts by mass of the dispersion liquid of resin fine particles for shell 4 was added, and then stirred for 10 minutes. Furthermore, 200 parts by mass of an aqueous 2% by mass calcium chloride solution was slowly added dropwise.

In this state, a small amount of the liquid was extracted as required, filtered through a 2 µm microfilter. Then, the stirring was continued at 25° C. until the filtrate became transparent. After confirming that the filtrate became transparent, the temperature was increased to 40° C., 133 parts by mass of an aqueous 5% by mass trisodium citrate solution was added, the temperature was increased to 65° C., and then the mixture was stirred for 1.5 hours. Thereafter, the obtained liquid was cooled to 25° C., followed by filtration and solid liquid separation. Thereafter, 800 parts by mass of ion exchanged water was added to the solid, and then stirred and washed for 30 minutes. Thereafter, filtration and solid liquid separation were performed again. In order to eliminate the influence of the remaining surfactant, filtration and washing were repeated as described above until the electrical conductivity of the filtrate reached 150 µS/cm or lower. Next, the obtained solid was dried to thereby obtain core-shell structure toner particles 7 of Example 7. The median diameter based on the volume of the obtained core-shell structure toner particles 7 was 6.2 µm. The zeta potential of the core particles and the zeta potential of the shell particles measured in the same manner as in Example 1 were −25 mV and −50 mV, respectively.

Example 8

1000 parts by mass of the core particle dispersion liquid 1 was placed in a tall beaker, and then stirred with a stirring blade at 25° C. in a water bath for heating. Subsequently, 60 parts by mass of the dispersion liquid of resin fine particles for shell 5 was added, and then stirred for 10 minutes. Furthermore, 180 parts by mass of an aqueous 2% by mass calcium chloride solution was slowly added dropwise.

In this state, a small amount of the liquid was extracted as required, filtered through a 2 µm microfilter. Then, the stirring was continued at 25° C. until the filtrate became transparent. After confirming that the filtrate became transparent, the temperature was increased to 40° C., 133 parts by mass of an aqueous 5% by mass trisodium citrate solution was added, the temperature was increased to 65° C., and then the mixture was stirred for 1.5 hours. Thereafter, the obtained liquid was cooled to 25° C., followed by filtration and solid liquid separation. Thereafter, 800 parts by mass of ion exchanged water was added to the solid, and then stirred and washed for 30 minutes. Thereafter, filtration and solid liquid separation were performed again. In order to eliminate the influence of the remaining surfactant, filtration and washing were repeated as described above until the electrical conductivity of the filtrate reached 150 µS/cm or lower. Next, the obtained solid was dried to thereby obtain core-shell structure toner particles 8 of Example 8. The median diameter based on the volume of the obtained core-shell structure toner particles 8 was 5.6 µm. The zeta potential of the core particles and the zeta potential of the shell particles measured in the same manner as in Example 1 were −29 mV and −48 mV, respectively.

Example 9

1000 parts by mass of the core particle dispersion liquid 2 was placed in a tall beaker, and then stirred with a stirring blade at 25° C. in a water bath for heating. Subsequently, 38 parts by mass of the dispersion liquid of resin fine particles for shell 1 was added, and then stirred for 10 minutes. Furthermore, 40 parts by mass of an aqueous 2% by mass calcium chloride solution was slowly added dropwise.

In this state, a small amount of the liquid was extracted as required, filtered through a 2 μm microfilter. Then, the stirring was continued at 25° C. until the filtrate became transparent. After confirming that the filtrate became transparent, the temperature was increased to 40° C., 40 parts by mass of an aqueous 5% by mass trisodium citrate solution was added, the temperature was increased to 65° C., and then the mixture was stirred for 1.5 hours. Thereafter, the obtained liquid was cooled to 25° C., followed by filtration and solid liquid separation. Thereafter, 800 parts by mass of ion exchanged water was added to the solid, and then stirred and washed for 30 minutes. Thereafter, filtration and solid liquid separation were performed again. In order to eliminate the influence of the remaining surfactant, filtration and washing were repeated as described above until the electrical conductivity of the filtrate reached 150 μS/cm or lower. Next, the obtained solid was dried to thereby obtain core-shell structure toner particles 9 of Example 9. The median diameter based on the volume of the obtained core-shell structure toner particles 9 was 6.2 μm. The zeta potential of the core dispersion liquid 2 and the zeta potential of the shell dispersion liquid 1 measured in the same manner as in Example 1 were −29 mV and −43 mV, respectively.

Comparative Example 1

1000 parts by mass of the core particle dispersion liquid 1 was placed in a tall beaker, and then stirred with a stirring blade at 25° C. in a water bath for heating. Subsequently, 38 parts by mass of the dispersion liquid of resin fine particles for shell 6 was added, and then stirred for 10 minutes. Furthermore, 133 parts by mass of an aqueous 2% by mass calcium chloride solution was slowly added dropwise.

In this state, a small amount of the liquid was extracted as required, filtered through a 2 μm microfilter. Then, the stirring was continued at 25° C. until the filtrate became transparent. After confirming that the filtrate became transparent, the temperature was increased to 40° C., 89 parts by mass of an aqueous 5% by mass trisodium citrate solution was added, the temperature was increased to 65° C., and then the mixture was stirred for 1.5 hours. Thereafter, the obtained liquid was cooled to 25° C., followed by filtration and solid liquid separation. Thereafter, 800 parts by mass of ion exchanged water was added to the solid, and then stirred and washed for 30 minutes. Thereafter, filtration and solid liquid separation were performed again. In order to eliminate the influence of the remaining surfactant, filtration and washing were repeated as described above until the electrical conductivity of the filtrate reached 150 μS/cm or lower. Next, the obtained solid was dried to thereby obtain core-shell structure toner particles 10 of Comparative Example 1. The median diameter based on the volume of the obtained core-shell structure toner particles 10 was 5.5 μm. The zeta potential of the core particles and the zeta potential of the shell particles measured in the same manner as in Example 1 were −29 mV and −16 mV, respectively.

Comparative Example 2

1000 parts by mass of the core particle dispersion liquid 1 was placed in a tall beaker, and then stirred with a stirring blade at 25° C. in a water bath for heating. Subsequently, 38 parts by mass of the dispersion liquid of resin fine particles for shell 7 was added, and then stirred for 10 minutes. Furthermore, 150 parts by mass of an aqueous 2% by mass calcium chloride solution was slowly added dropwise.

In this state, a small amount of the liquid was extracted as required, filtered through a 2 μm microfilter. Then, the stirring was continued at 25° C. until the filtrate became transparent. After confirming that the filtrate became transparent, the temperature was increased to 40° C., 100 parts by mass of an aqueous 5% by mass trisodium citrate solution was added, the temperature was increased to 65° C., and then the mixture was stirred for 1.5 hours. Thereafter, the obtained liquid was cooled to 25° C., followed by filtration and solid liquid separation. Thereafter, 800 parts by mass of ion exchanged water was added to the solid, and then stirred and washed for 30 minutes. Thereafter, filtration and solid liquid separation were performed again. In order to eliminate the influence of the remaining surfactant, filtration and washing were repeated as described above until the electrical conductivity of the filtrate reached 150 μS/cm or lower. Next, the obtained solid was dried to thereby obtain core-shell structure toner particles 11 of Comparative Example 2. The median diameter based on the volume of the obtained core-shell structure toner particles 11 was 5.5 μm. The zeta potential of the core particles and the zeta potential of the shell particles measured in the same manner as in Example 1 were −30 mV and −18 mV, respectively.

Comparative Example 3

1000 parts by mass of the core particle dispersion liquid 1 was placed in a tall beaker, and then stirred with a stirring blade at 25° C. in a water bath for heating. Subsequently, 38 parts by mass of the dispersion liquid of resin fine particles for shell 1 was added, and then stirred for 10 minutes. Furthermore, 200 parts by mass of an aqueous 5% by mass calcium chloride solution was slowly added dropwise.

In this state, a small amount of the liquid was extracted as required, filtered through a 2 μm microfilter. Then, the stirring was continued at 25° C. until the filtrate became transparent. After confirming that the filtrate became transparent, the temperature was increased to 40° C., 100 parts by mass of an aqueous 5% by mass trisodium citrate solution was added, the temperature was increased to 65° C., and then the mixture was stirred for 1.5 hours. Thereafter, the obtained liquid was cooled to 25° C., followed by filtration and solid liquid separation. Thereafter, 800 parts by mass of ion exchanged water was added to the solid, and then stirred and washed for 30 minutes. Thereafter, filtration and solid liquid separation were performed again. In order to eliminate the influence of the remaining surfactant, filtration and washing were repeated as described above until the electrical conductivity of the filtrate reached 150 μS/cm or lower. Next, the obtained solid was dried to thereby obtain core-shell structure toner particles 12 of Comparative Example 3. The median diameter based on the volume of the obtained core-shell structure toner particles 12 was 5.5 μm. The zeta potential of the core particles and the zeta potential of the shell particles measured in the same manner as in Example 1 were −30 mV and −19 mV, respectively.

The zeta potential of the core particles in the core particle dispersion liquid and the zeta potential of the shell particles in the dispersion liquid of resin fine particles for shell before adding metal salt used in each of Examples 1 to 9 and Comparative Examples 1 to 3 were the same polarity.

The following evaluation was carried out using the toner particles 1 to 12 of Examples 1 to 9 and Comparative Examples 1 to 3. Tables 1-1, 1-2, and 2 show the list of the constituent components and the characteristics and Table 3 shows the evaluation results.

State of Core-Shell Structure

The toner particles 1 to 12 were individually observed under a scanning electron microscope (FE-SEM) (S4800: manufactured by Hitachi High-Technologies Corporation) at a magnification of 20,000 times after platinum vapor deposition. The observed images were visually evaluated. The evaluation results are shown in Table 3.

A: There is no aggregation of the resin fine particles for shell and a shell layer covers the core particles.
B: There is aggregation of the resin fine particles for shell and the core particle surface is exposed.

Evaluation of High Temperature Storageability

By dry blending 1.8 parts by mass of silica powder subjected to hydrophobic treatment having a specific surface area measured by the BET method of 200 m$^2$/g with 100 parts by mass of the toner particles by a Henschel mixer (manufactured by Mitsui Mining & Smelting Co., Ltd.), toner in which the silica powder subjected to hydrophobic treatment was externally added to the toner particles 1 to 12 was obtained. Each toner was allowed to stand still in a thermostat under the conditions of a temperature of 50° C. and a humidity of 10% for 24 hours. Then, the blocking level of each toner was visually evaluated. The evaluation results are shown in Table 3.

A: Blocking does not occur.
B: Although blocking occurs, the block is easily dispersed by slight vibration.
C: Although blocking occurs, the block is dispersed by continuously vibrating.
D: Blocking occurs, and the block is not dispersed even when applying force.

Evaluation of High Humidity Storageability

By dry blending 1.8 parts by mass of silica powder subjected to hydrophobic treatment having a specific surface area measured by the BET method of 200 m$^2$/g with 100 parts by mass of the toner particles by a Henschel mixer (manufactured by Mitsui Mining & Smelting Co., Ltd.), toner in which the silica powder subjected to hydrophobic treatment was externally added to the toner particles 1 to 12 was obtained. Each toner was allowed to stand still in a constant-temperature high-humidity chamber under the conditions of a temperature of 40° C. and a humidity of 95% for one week. Then, the blocking level of each toner was visually evaluated. The evaluation results are shown in Table 3.

A: Blocking does not occur.
B: Although blocking occurs, the block is easily dispersed by slight vibration.
C: Although blocking occurs, the block is dispersed by continuously vibrating.
D: Blocking occurs, and the block is not dispersed even when applying force.

TABLE 1-1

| | Dispersion liquid of core particles | | | | |
|---|---|---|---|---|---|
| | Dispersion liquid of resin fine particles for core No. | Type of resin for core | Concentration of resin for core in core particles in dispersion liquid of resin fine particles for core | Concentration of core particles in core particle dispersion liquid | Median diameter based on volume of core particles |
| Ex. 1 | 1 | Polyester resin A | 50% by mass | 10% by mass | 5.5 μm |
| Ex. 2 | 1 | Polyester resin A | 50% by mass | 10% by mass | 5.5 μm |
| Ex. 3 | 1 | Polyester resin A | 50% by mass | 10% by mass | 5.5 μm |
| Ex. 4 | 1 | Polyester resin A | 50% by mass | 10% by mass | 5.5 μm |
| Ex. 5 | 1 | Polyester resin A | 50% by mass | 10% by mass | 5.5 μm |
| Ex. 6 | 1 | Polyester resin A | 50% by mass | 10% by mass | 5.5 μm |
| Ex. 7 | 1 | Polyester resin A | 50% by mass | 10% by mass | 5.5 μm |
| Ex. 8 | 1 | Polyester resin A | 50% by mass | 10% by mass | 5.5 μm |
| Ex. 9 | 2 | Styrene acrylic resin | — | 10% by mass | 6.0 μm |
| Comp. Ex. 1 | 1 | Polyester resin A | 50% by mass | 10% by mass | 5.5 μm |
| Comp. Ex. 2 | 1 | Polyester resin A | 50% by mass | 10% by mass | 5.5 μm |
| Comp. Ex. 3 | 1 | Polyester resin A | 50% by mass | 10% by mass | 5.5 μm |

TABLE 1-2

| | Dispersion liquid of resin particles for shell | | | | | | | | | |
|---|---|---|---|---|---|---|---|---|---|---|
| | Dispersion liquid of resin fine particles for shell No. | Type of resin for shell | Acid value of resin for shell | Method for emulsifying resin fine particles for shell | Surfactant type | Addition ratio of surfactant to resin for shell | Amine equivalent amount | Addition amount of amine | Addition amount of ion exchanged water | Concentration of shell particles in dispersion liquid of resin fine particles for shell | Median diameter based on volume of shell particles |
| Ex. 1 | 1 | Polyester resin C | 13 mgKOH/g | No-solvent emulsification | (SN-1) | 2% by mass | 2.5 eq | 8.10 parts by mass | 169.50 parts by mass | 40% by mass | 0.25 μm |

TABLE 1-2-continued

Dispersion liquid of resin particles for shell

| | Dispersion liquid of resin fine particles for shell No. | Type of resin for shell | Acid value of resin for shell | Method for emulsifying resin fine particles for shell | Surfactant type | Addition ratio of surfactant to resin for shell | Amine equivalent amount | Addition amount of amine | Addition amount of ion exchanged water | Concentration of shell particles in dispersion liquid of resin fine particles for shell | Median diameter based on volume of shell particles |
|---|---|---|---|---|---|---|---|---|---|---|---|
| Ex. 2 | 1 | Polyester resin C | 13 mgKOH/g | No-solvent emulsification | (SN-1) | 2% by mass | 2.5 eq | 8.10 parts by mass | 169.50 parts by mass | 40% by mass | 0.25 μm |
| Ex. 3 | 1 | Polyester resin C | 13 mgKOH/g | No-solvent emulsification | (SN-1) | 2% by mass | 2.5 eq | 8.10 parts by mass | 169.50 parts by mass | 40% by mass | 0.25 μm |
| Ex. 4 | 2 | Polyester resin C | 13 mgKOH/g | No-solvent emulsification | (SN-1) | 1.5% by mass | 2.5 eq | 8.10 parts by mass | 170.10 parts by mass | 40% by mass | 0.35 μm |
| Ex. 5 | 1 | Polyester resin C | 13 mgKOH/g | No-solvent emulsification | (SN-1) | 2% by mass | 2.5 eq | 8.10 parts by mass | 169.50 parts by mass | 40% by mass | 0.25 μm |
| Ex. 6 | 3 | Polyester resin C | 13 mgKOH/g | No-solvent emulsification | (MN-1) | 2% by mass | 2.5 eq | 8.10 parts by mass | 169.50 parts by mass | 40% by mass | 0.29 μm |
| Ex. 7 | 4 | Polyester resin D | 19 mgKOH/g | No-solvent emulsification | (SN-1) | 2% by mass | 2.5 eq | 11.90 parts by mass | 165.70 parts by mass | 40% by mass | 0.10 μm |
| Ex. 8 | 5 | Polyester resin C | 13 mgKOH/g | Phase-inversion emulsification | (RK) | 0.5% by mass | 2.5 eq | 1.90 parts by mass | 177.80 parts by mass | 25% by mass | 0.09 μm |
| Ex. 9 | 1 | Polyester resin C | 13 mgKOH/g | No-solvent emulsification | (SN-1) | 2% by mass | 2.5 eq | 8.10 parts by mass | 169.50 parts by mass | 40% by mass | 0.25 μm |
| Comp. Ex. 1 | 6 | Polyester resin C | 13 mgKOH/g | No-solvent emulsification | (RK) | 2% by mass | 2.5 eq | 8.10 parts by mass | 169.50 parts by mass | 40% by mass | 0.25 μm |
| Comp. Ex. 2 | 7 | Polyester resin C | 13 mgKOH/g | No-solvent emulsification | (RK) | 3.5% by mass | 2.5 eq | 8.10 parts by mass | 167.70 parts by mass | 40% by mass | 0.30 μm |
| Comp. Ex. 3 | 1 | Polyester resin C | 13 mgKOH/g | No-solvent emulsification | (SN-1) | 2% by mass | 2.5 eq | 8.10 parts by mass | 169.50 parts by mass | 40% by mass | 0.25 μm |

TABLE 2

Manufacturing of core-shell structure toner particles

| | Zeta potential of core particles when adding metal salt | Zeta potential of shell particles when adding metal salt | Metal salt type | Addition amount of dispersion liquid of resin fine particles for shell | Addition amount of 2% by mass metal salt | Addition amount of 5% by mass citric acid | Median diameter of core-shell structure toner particles | (Diameter of shell particles/ Median diameter of core particles) ×400 | (Diameter of shell particles/ Median diameter of core particles) ×800 |
|---|---|---|---|---|---|---|---|---|---|
| Ex. 1 | −25 mV | −43 mV | CaCl$_2$ | 113 parts by mass | 200 parts by mass | 133 parts by mass | 5.6 μm | 18 | 36 |
| Ex. 2 | −26 mV | −44 mV | CaCl$_2$ | 75 parts by mass | 190 parts by mass | 127 parts by mass | 5.7 μm | 18 | 36 |
| Ex. 3 | −27 mV | −46 mV | CaCl$_2$ | 38 parts by mass | 180 parts by mass | 120 parts by mass | 5.8 μm | 18 | 36 |
| Ex. 4 | −29 mV | −48 mV | CaCl$_2$ | 75 parts by mass | 166 parts by mass | 111 parts by mass | 5.8 μm | 25 | 51 |
| Ex. 5 | −27 mV | −36 mV | MgSO$_2$ | 38 parts by mass | 250 parts by mass | 167 parts by mass | 5.8 μm | 18 | 36 |
| Ex. 6 | −29 mV | −40 mV | CaCl$_2$ | 38 parts by mass | 166 parts by mass | 111 parts by mass | 5.8 μm | 21 | 42 |
| Ex. 7 | −25 mV | −50 mV | CaCl$_2$ | 38 parts by mass | 200 parts by mass | 133 parts by mass | 6.2 μm | 7 | 15 |
| Ex. 8 | −29 mV | −48 mV | CaCl$_2$ | 60 parts by mass | 180 parts by mass | 120 parts by mass | 5.6 μm | 7 | 13 |
| Ex. 9 | −29 mV | −43 mV | CaCl$_2$ | 38 parts by mass | 40 parts by mass | 40 parts by mass | 6.2 μm | 17 | 33 |
| Comp. Ex. 1 | −31 mV | −16 mV | CaCl$_2$ | 38 parts by mass | 133 parts by mass | 89 parts by mass | 5.5 μm | 18 | 36 |
| Comp. Ex. 2 | −30 mV | −18 mV | CaCl$_2$ | 38 parts by mass | 150 parts by mass | 100 parts by mass | 5.5 μm | 22 | 44 |
| Comp. Ex. 3 | −30 mV | −18 mV | NaCl | 38 parts by mass | 150 parts by mass | 100 parts by mass | 5.5 μm | 18 | 36 |

TABLE 3

| | Toner particle No. | Usage of organic solvent when producing dispersion liquid of resin fine particles for shell | State of core-shell structure | High temperature storageability | High humidity storageability |
|---|---|---|---|---|---|
| Ex. 1 | 1 | Not used | A | A | A |
| Ex. 2 | 2 | Not used | A | B | B |

TABLE 3-continued

| | Toner particle No. | Usage of organic solvent when producing dispersion liquid of resin fine particles for shell | State of core-shell structure | High temperature storageability | High humidity storageability |
|---|---|---|---|---|---|
| Ex. 3 | 3 | Not used | A | C | B |
| Ex. 4 | 4 | Not used | A | C | B |
| Ex. 5 | 5 | Not used | A | C | B |
| Ex. 6 | 6 | Not used | A | C | B |
| Ex. 7 | 7 | Not used | A | A | C |
| Ex. 8 | 8 | Used | A | A | A |
| Ex. 9 | 9 | Not used | A | C | B |
| Comp. Ex. 1 | 10 | Not used | B | D | D |
| Comp. Ex. 2 | 11 | Not used | B | D | D |
| Comp. Ex. 3 | 12 | Not used | B | D | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-219911 filed Oct. 4, 2011, which is hereby incorporated by reference herein in its entirety.

The invention claimed is:

1. A method for manufacturing core-shell structure fine particles, comprising:
adding metal salt into an aqueous medium in which at least shell particles A and core particles B are dispersed to thereby attach the shell particles A to the surface of each of the core particles B,
the shell particles A and the core particles B satisfying the following relationships (1) to (3);
(1) A zeta potential of the core particles B and a zeta potential of the shell particles A are the same polarity.
(2) |Zeta potential of the core particles B when adding the metal salt|<|Zeta potential of the shell particles A when adding the metal salt|
(3) (Median diameter based on a volume of the core particles B)>(Median diameter based on a volume of the shell particles A).

2. The method for manufacturing core-shell structure fine particles according to claim 1, wherein
the shell particles A are manufactured by emulsifying resin for shell in an aqueous medium by applying shearing force to the resin for shell which are warmed to a temperature higher than a softening temperature (Tm) of the resin for shell in the aqueous medium.

3. The method for manufacturing core-shell structure fine particles according to claim 1, wherein
the metal salt is calcium salt or magnesium salt.

4. The method for manufacturing core-shell structure fine particles according to claims 1, wherein
to the shell particles A, a surfactant containing carboxylic acid or carboxylic acid salt is adsorbed and, to the core particles B, a surfactant containing sulfonic acid salt is adsorbed.

5. The method for manufacturing core-shell structure fine particles according to claim 1, wherein
a ratio (% by mass) of an addition amount of the shell particles A to an addition amount of the core particles B satisfies the following relationship (4),
(4) (Proportion of the addition amount of the shell particles A (% by mass))>[{(Median diameter based on the volume of the shell particles A ($\mu$m))/ (Median diameter based on the volume of the core particles B ($\mu$m))}× 400].

6. The method for manufacturing core-shell structure fine particles according to claims 1, wherein
the shell particles A contain resin having an acid value of 3 mgKOH/g or more and 15 mgKOH/g or lower.

7. A toner, comprising:
toner particles; and
an external additive,
the toner particles being manufactured by the method for manufacturing core-shell structure fine particles according to claim 1.

* * * * *